US008555298B2

(12) United States Patent
Matsui

(10) Patent No.: US 8,555,298 B2
(45) Date of Patent: Oct. 8, 2013

(54) APPLICATION MANAGEMENT SYSTEM AND METHOD OF CONTROLLING THE SAME

(75) Inventor: Yuma Matsui, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1240 days.

(21) Appl. No.: 11/954,409

(22) Filed: Dec. 12, 2007

(65) Prior Publication Data

US 2008/0148297 A1    Jun. 19, 2008

(30) Foreign Application Priority Data

Dec. 14, 2006    (JP) ................................. 2006-337589

(51) Int. Cl.
*G06F 9/44*    (2006.01)

(52) U.S. Cl.
USPC ........... 719/331; 719/312; 719/313; 719/321; 719/328; 717/104; 717/105; 717/113; 717/140; 717/178; 715/234; 715/256; 715/744; 715/835; 715/967

(58) Field of Classification Search
None
See application file for complete search history.

(56) References Cited

U.S. PATENT DOCUMENTS

| 5,630,131 | A | * | 5/1997 | Palevich et al. | 717/108 |
| 5,895,477 | A | * | 4/1999 | Orr et al. | 715/202 |
| 5,929,852 | A | * | 7/1999 | Fisher et al. | 715/739 |
| 6,263,491 | B1 | * | 7/2001 | Hunt | 717/130 |
| 6,381,735 | B1 | * | 4/2002 | Hunt | 717/158 |
| 6,389,589 | B1 | * | 5/2002 | Mishra et al. | 717/170 |
| 6,499,137 | B1 | * | 12/2002 | Hunt | 717/164 |
| 6,968,538 | B2 | * | 11/2005 | Rust et al. | 717/108 |
| 2003/0079177 | A1 | * | 4/2003 | Brintzenhofe et al. | 715/500 |
| 2003/0110312 | A1 | * | 6/2003 | Gunduc et al. | 709/328 |
| 2003/0184584 | A1 | * | 10/2003 | Vachuska et al. | 345/762 |
| 2005/0071135 | A1 | * | 3/2005 | Vredenburgh et al. | 703/1 |
| 2005/0183094 | A1 | * | 8/2005 | Hunt | 719/315 |

FOREIGN PATENT DOCUMENTS

| JP | 2000-148464 A | 5/2000 |
| JP | 2006-285313 A | 10/2006 |
| JP | 2006-309621 A | 11/2006 |

\* cited by examiner

*Primary Examiner* — Andy Ho
*Assistant Examiner* — Shih-Wei Kraft
(74) *Attorney, Agent, or Firm* — Carter, DeLuca, Farrell & Schmidt, LLP

(57) ABSTRACT

An object of this invention is to enable free customization of a component class executed by an application program. To achieve this object, an information processing apparatus executably stores an application program main body and a class library having a plurality of classes. The apparatus includes a unit which acquires the name of an interface described in the application program main body and the name of a customization point, a unit which acquires the name of an interface stored in the class library and the name of a class belonging to the interface, a unit which generates an instance for each customization point by executing a selected one of the classes belonging to the interface corresponding to the customization point, a unit which embeds the instance at the corresponding customization point, and a unit which executes the application program main body with the instance being embedded.

4 Claims, 12 Drawing Sheets

APPLICATION MANAGEMENT SYSTEM AND METHOD OF CONTROLLING THE SAME

BACKGROUND OF THE INVENTION

1. Field of the Invention

The present invention relates to an information processing technology in an information processing apparatus storing an application program that runs on a virtual machine (VM) through an application management framework.

2. Description of the Related Art

A virtual machine (VM) is conventionally known as a technique of making an application program stably run under environments with different computer resources (e.g., OS and CPU). This technique obviates application program redesign depending on a computer resource and allows the application program to run similarly under different environments.

Recently, an "application management framework" is used to cause a plurality of application programs to run on a VM. The application management framework enables arbitrary control of activation and stop of a plurality of application programs.

A system (to be referred to as an "application processing system" hereinafter) for making an application program run on a VM using an application management framework generally has a system configuration as shown in FIG. 12.

FIG. 12 is a block diagram showing an example of the system configuration of an application processing system 1200. Referring to FIG. 12, an application program main body 1202 on an application management framework 1201 executes component classes included in a component class library 1203, thereby implementing a desired function.

More specifically, the names of the component classes to be executed by the application program main body 1202 are described. When a process starts, the application program main body 1202 invokes the component classes. In accordance with invocation from the application program main body 1202, an application management framework 1201 loads corresponding component classes to the application program main body 1202 to execute them.

The application program main body 1202 generates a component instance. The component instance is executed upon execution of the application program main body 1202 so that a desired function is implemented.

Even in adding a new function, the application processing system 1200 can minimize correction of the application program main body 1202 using the component class library 1203. Hence, a system with the above-described configuration is convenient for a system developer.

On the other hand, the system 1200 assumes that the names of component classes are described in the application program main body 1202 in invoking the component classes. For this reason, even when a specific component class should be changed (customized) to another component class, the system developer needs to modify the description in the application program.

When the application program main body 1202 is modified, it is always necessary to execute processes such as recompilation and rearrangement of the application program independently of the modification amount. That is, an operation by the system developer is indispensable, and any user of the application processing system cannot customize the component classes.

SUMMARY OF THE INVENTION

The present invention has been made in consideration of the above problems, and has as its object to allow a user of a system with an application program that runs on a VM through an application management framework to freely customize component classes.

In order to achieve the above object, an information processing apparatus according to the present invention has the following arrangement. That is, there is provided an information processing apparatus which executably stores an application program and a class library having a plurality of classes, comprising:

a first acquisition unit configured to acquire, in accordance with an execution instruction of the application program, information about an interface described in the application program and information about a position in the application program where the interface is described;

a second acquisition unit configured to acquire, in accordance with the execution instruction of the application program, information about an interface stored in the class library and information about a class belonging to the interface;

a generation unit configured to generate an instance for each information about the position by executing, of the classes belonging to the interface corresponding to the acquired information about the position, a class selected by a user;

an embedding unit configured to embed the generated instance in the application program on the basis of the corresponding information about the position; and an execution unit configured to execute the application program with the instance being embedded.

According to the present invention, in a system having an application program which runs on a VM through an application management framework, the system user can freely customize a component class.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail in accordance with the accompanying drawings.

Best Mode for Carrying Out the Invention

The best mode for carrying out the invention will be described below in detail with reference to the accompanying drawings. An application processing system to which the present invention is applicable can be executed by any information processing apparatus if an execution environment for the system is provided.

First Embodiment

1. Hardware Configuration of Information Processing Apparatus

Figure 1:
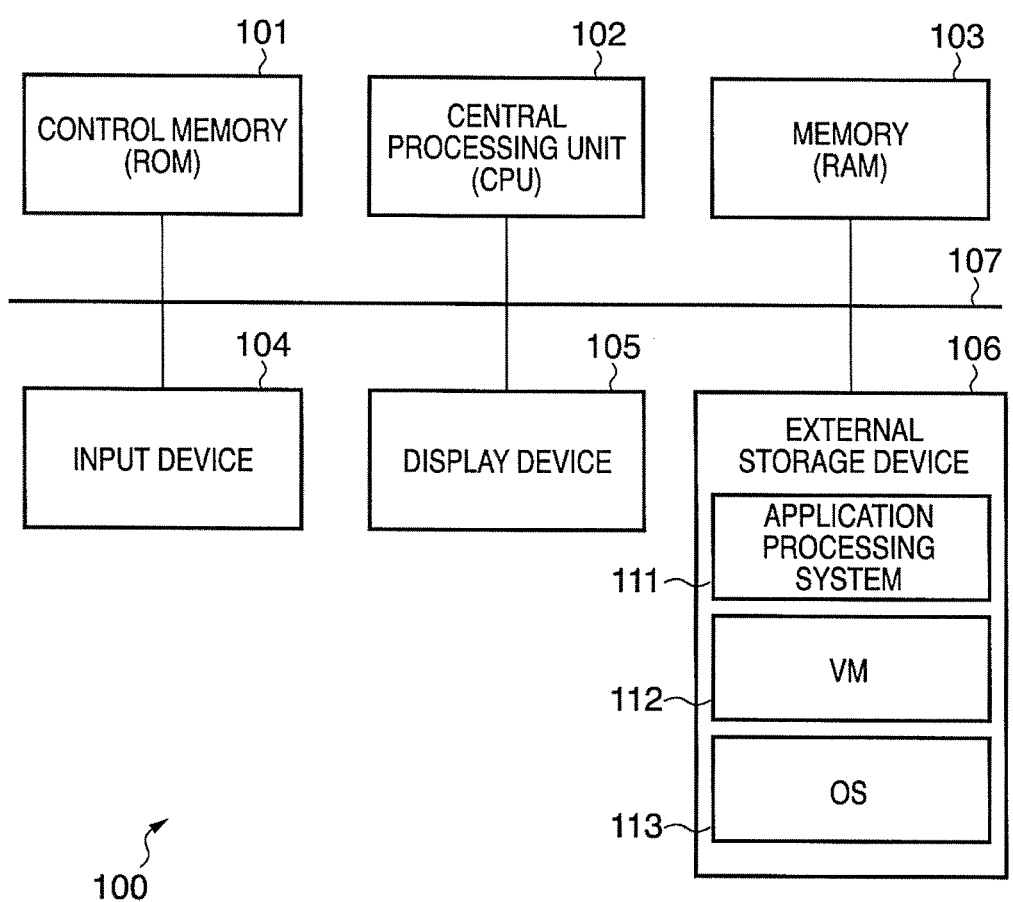
FIG. 1 is a block diagram showing the hardware configuration of an information processing apparatus.

FIG. 1 is a block diagram showing the hardware configuration of an information processing apparatus according to the first embodiment of the present invention. As shown in FIG. 1, an information processing apparatus 100 comprises a control memory (ROM) 101, central processing unit (CPU) 102, memory (PAM) 103, input device 104, display device 105, and external storage device 106, which are connected to each other via a bus 107.

The external storage device (computer-readable storage medium) 106 stores an OS 113, virtual machine (VM) 112, and various kinds of control programs of, e.g., an application processing system 111 (to be described later) and various kinds of information to be used by the control programs. The control programs and various kinds of information are loaded to the memory 103 as needed under the control of the central processing unit (CPU) 102 and executed by it.

Note that the application processing system 111 according to this embodiment runs on the VM 112.

2. Detailed Arrangement of Application Processing System 111

2.1 Constituent Elements of Application Processing System 111

Figure 2:
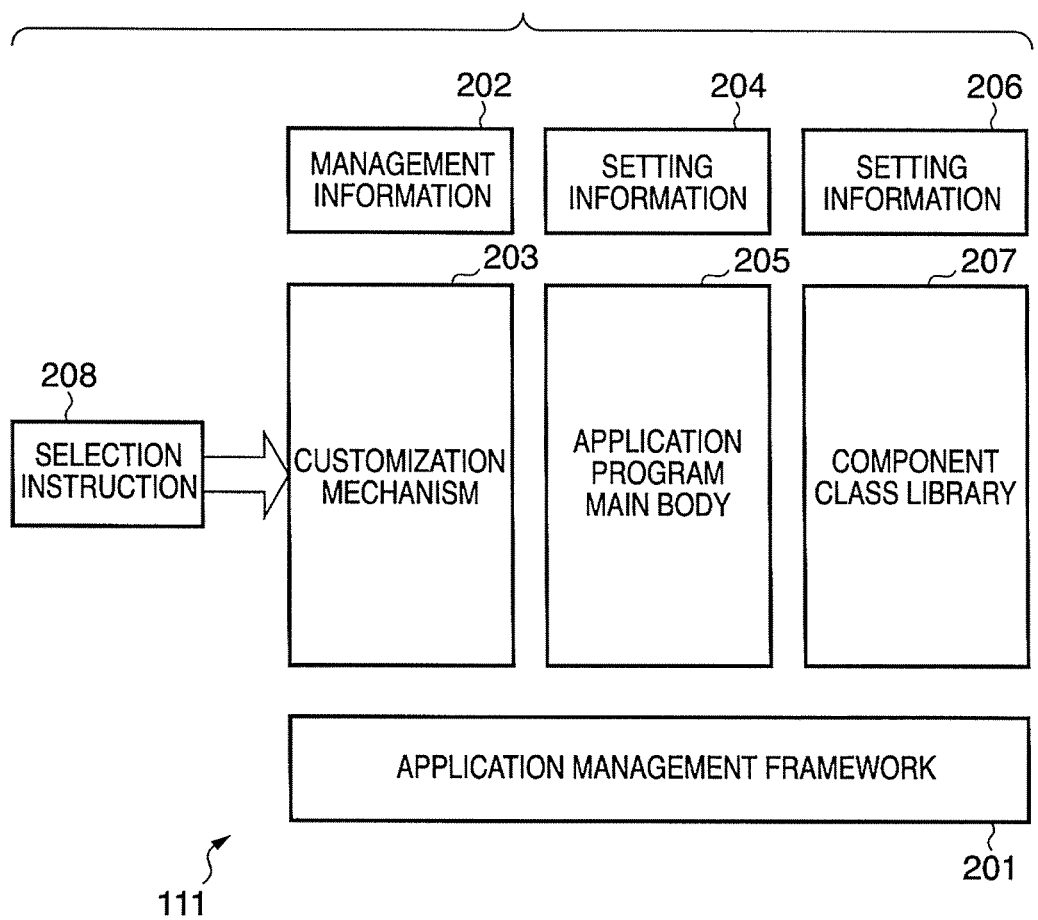
FIG. 2 is a view showing an example of the detailed arrangement of an application processing system 111.

FIG. 2 is a view showing an example of the detailed arrangement of the application processing system 111.

As shown in FIG. 2, the application processing system 111 comprises an application management framework 201, customization mechanism 203, application program main body 205, and component class library 207. The application processing system 111 also has management information 202 and pieces of setting information 204 and 206 to be used in executing the constituent elements.

FIG. 2 illustrates one application program main body 205 and one component class library 207 for the descriptive convenience. However, the system may include a plurality of application program main bodies or a plurality of component class libraries.

2.2 Functions of Elements

Figure 12:
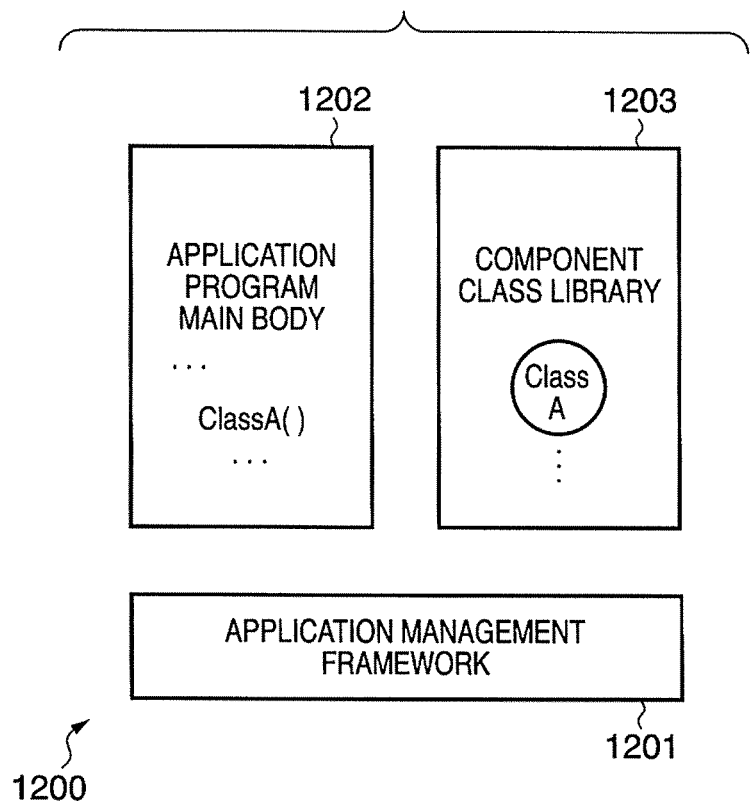
FIG. 12 is a block diagram showing an example of the system configuration of an application processing system 1200.

The elements included in the application processing system 111 have the following functions in addition to those of the prior art described with reference to FIG. 12.

(1) Application Management Framework 201

The application management framework 201 has a function of instructing not only the application program main body 205 and component class library 207 but also the customization mechanism 203 to start or stop a process. The application management framework 201 also has a function of making the customization mechanism 203 usable from the application program main body 205.

(2) Application Program Main Body 205

Processes to be executed are described in the application program main body 205 using a predetermined program language. As a characteristic feature of this embodiment, the description includes a "component interface" that is a description representing a process of activating component classes.

If the application program main body 205 includes a component interface, the application processing system 111 activates, of component classes belonging to the interface, a component class selected by the system user at that position. That is, a position where a component interface is described represents that the system user can customize a component class. Hence, a position where a component interface is described will be referred to as a "customization point" hereinafter.

Figure 3:
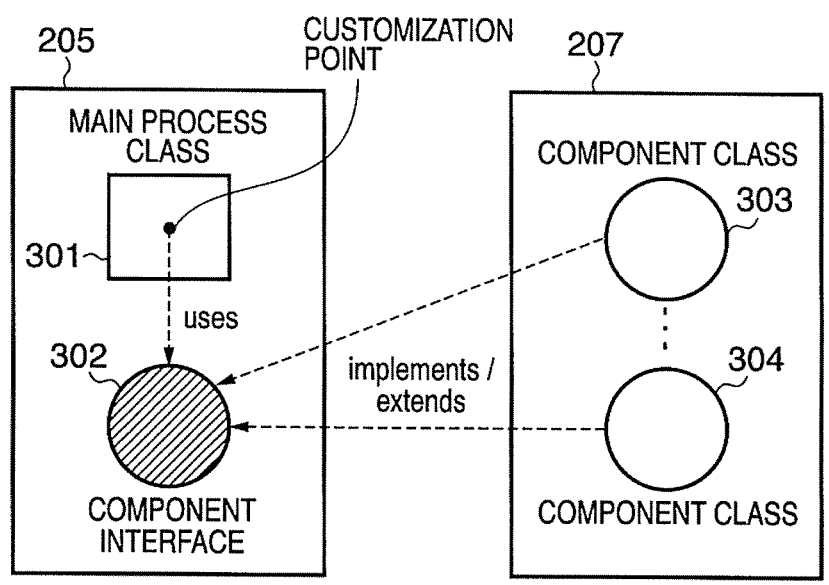
FIG. 3 is a view showing internal arrangements of an application program main body 205 and component class library 207.

FIG. 3 schematically shows the description contents of the application program main body 205. As shown in FIG. 3, a main process class 301 for a main process is described in the application program main body 205. A component interface 302 is described at a customization point in the main process class 301. A plurality of component classes 303 and 304 in the component class library 207 belong to the component interface 302.

Referring back to FIG. 2, the application program main body 205 has a function of transmitting the setting information 204 representing the correspondence between the customization point and the component interface to the customization mechanism 203 and requesting it to register the setting information 204 as the management information 202.

The application program main body 205 also has a function of acquiring, from the customization mechanism 203 (to be described later), a component instance generated when a component class belonging to the component interface 302 is executed and embedding the component instance in the application program main body 205.

(3) Component Class Library 207

The component class library 207 has a function of transmitting the setting information 206 representing the dependent relationship between each component interface and the name of each component class to the customization mechanism 203 and requesting it to register the setting information 206 as the management information 202.

(4) Customization Mechanism 203

The customization mechanism 203 has a function of acquiring the setting information 204 of the application program main body 205 on the basis of a request from it (first acquisition unit) and registering the acquired information as the management information 202.

The customization mechanism 203 also has a function of acquiring the setting information 206 of the component class library 207 on the basis of a request from it (second acquisition unit) and registering the acquired information as the management information 202. The customization mechanism 203 registers the setting information 204 and setting information 206 in association with each other.

The customization mechanism 203 also has a function of managing a component class corresponding to a customization point in the application program main body 205 on the basis of the setting information 204 and 206 registered in the management information 202.

The customization mechanism 203 further has a function of generating a component instance by executing a component class corresponding to each customization point in accordance with a request from the application program main body 205, and transmitting the component instance to the application program main body 205.

The customization mechanism 203 also has a function of providing a user interface to cause the user to select a component class corresponding to each customization point. The customization mechanism 203 receives, through the user interface, a selection instruction 208 from the user for a component class corresponding to each customization point.

3. Detailed Configuration of Management Information 202 and Setting Information 204 and 206

Figure 4:
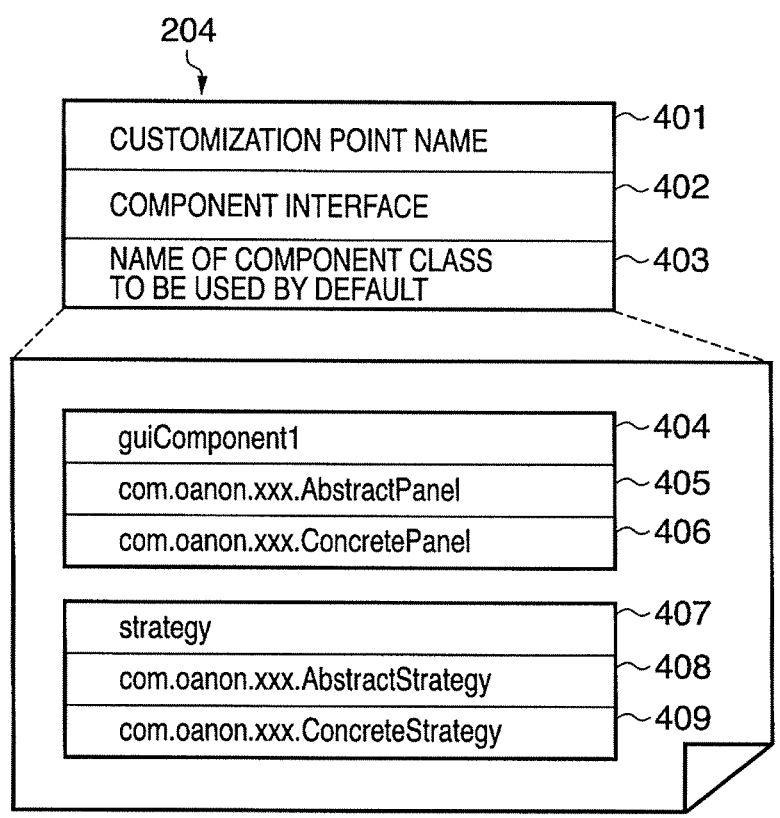
FIG. 4 is a view showing an example of setting information 204 stored in association with the application program main body 205.

FIG. 4 is a view showing an example of the setting information 204 stored in association with the application program main body 205. Any parameters other than those shown in FIG. 4 may be defined as the setting information 204.

As shown in FIG. 4, the setting information 204 mainly includes three pieces of information. Information 401 represents the name of a customization point. Any arbitrary name unique in the application processing system 111 can be designated. Information 402 represents a component interface. An interface or super class in object-oriented programming can be designated.

Information 403 represents the name of a component class to be used for the customization point by default. The name of a component class belonging to the component interface can be designated. The description of the name 403 of the component class to be used by default is arbitrary.

Reference numerals 404 to 406 and 407 to 409 indicate detailed setting examples of the setting information 204. In this case, a plurality of customization points exist.

Figure 5:
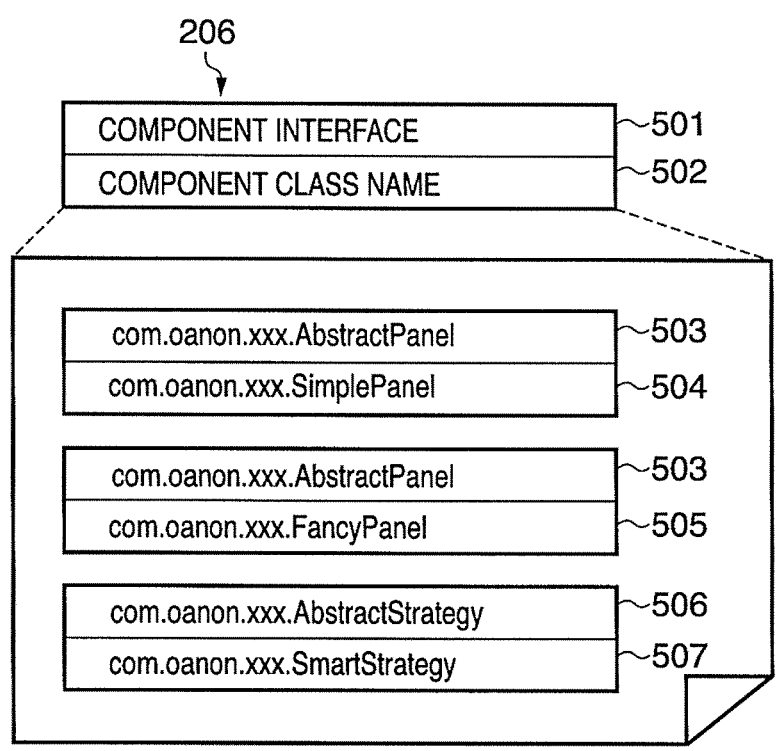
FIG. 5 is a view showing an example of setting information 206 stored in association with the component class library 207.

FIG. 5 is a view showing an example of the setting information 206 stored in association with the component class library 207. As shown in FIG. 5, the setting information 206 mainly includes two pieces of information. Information 501 represents a component interface. An interface or super class in object-oriented programming can be designated. Information 502 represents the name of a component class. The name of a component class belonging to the component interface 501 can be designated.

Reference numerals 503 and 504, 503 and 505, and 506 and 507 indicate detailed setting examples of the setting information 206. In this case, a plurality of component interfaces and a plurality of component classes exist.

Figure 6:
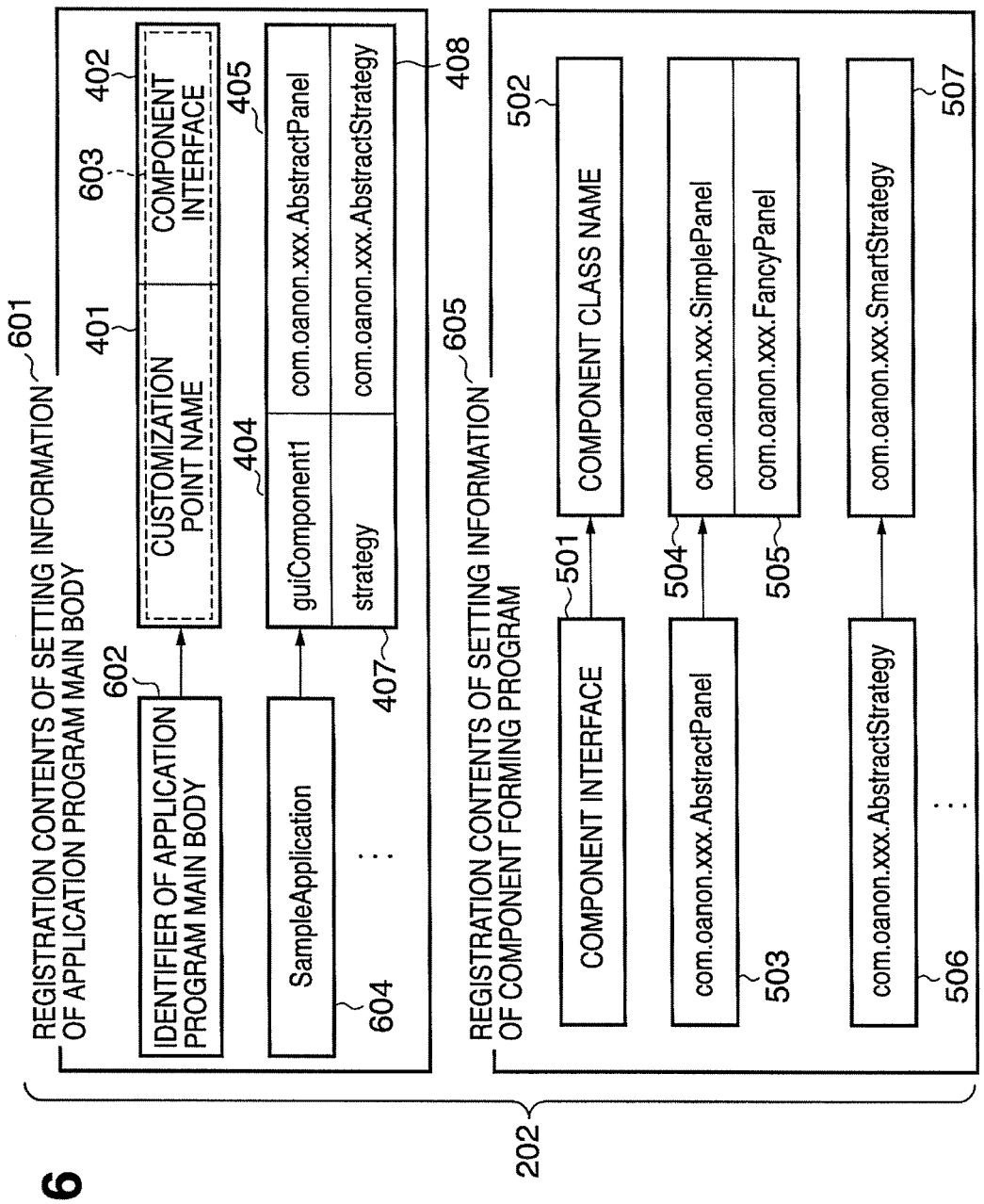
FIG. 6 is a view showing the configuration of management information 202 registered by a customization mechanism 203.

FIG. 6 is a view showing the configuration of the management information 202 registered by the customization mechanism 203. As shown in FIG. 6, the customization mechanism 203 registers, as the management information 202, two pieces of setting information, i.e., the setting information 204 of the application program main body 205 and the setting information 206 of the component class library 207 in association with each other.

Registration contents 601 of the setting information 204 of the application program main body 205 include an identifier 602 of the application program main body and an arbitrary number of pieces of customization point information 603 corresponding to the identifier 602.

The customization point information 603 includes the customization point name 401 and component interface 402. Reference numeral 604 indicates a detailed example of the identifier 602. In this example, the customization point name 404 and component interface 405, and the customization point name 407 and component interface 408 are associated with each other.

On the other hand, registration contents 605 of the setting information 206 of the component class library 207 include the component interface 501 and an arbitrary number of component class names 502 belonging to the component interface 501. Reference numeral 503 indicates a detailed example of the component interface 501. In this example, the component class names 504 and 505 belong to the component interface 501.

As described above, the customization mechanism 203 manages, as the management information 202, the setting information 204 of the application program main body 205 and the setting information 206 of the component class library 207. When the identifier 602 of the application program main body 205 and the customization point name 401 are designated, the name 502 of the component class usable at the customization point can be obtained.

That is, the component interface 402 is specified on the basis of the identifier 602 of the application program main body 205 and the customization point name 401. When the component interface 501 in the setting information 206 of the component class library corresponding to the specified component interface 402 is collated, the name 502 of the component class usable at the designated customization point can be obtained.

A plurality of component class candidates exist for one customization point while one component class can correspond to a plurality of customization points. That is, the component classes and customization points are in a many-to-many correspondence.

4. Sequence of Process of Customization Mechanism 203

Figure 7:
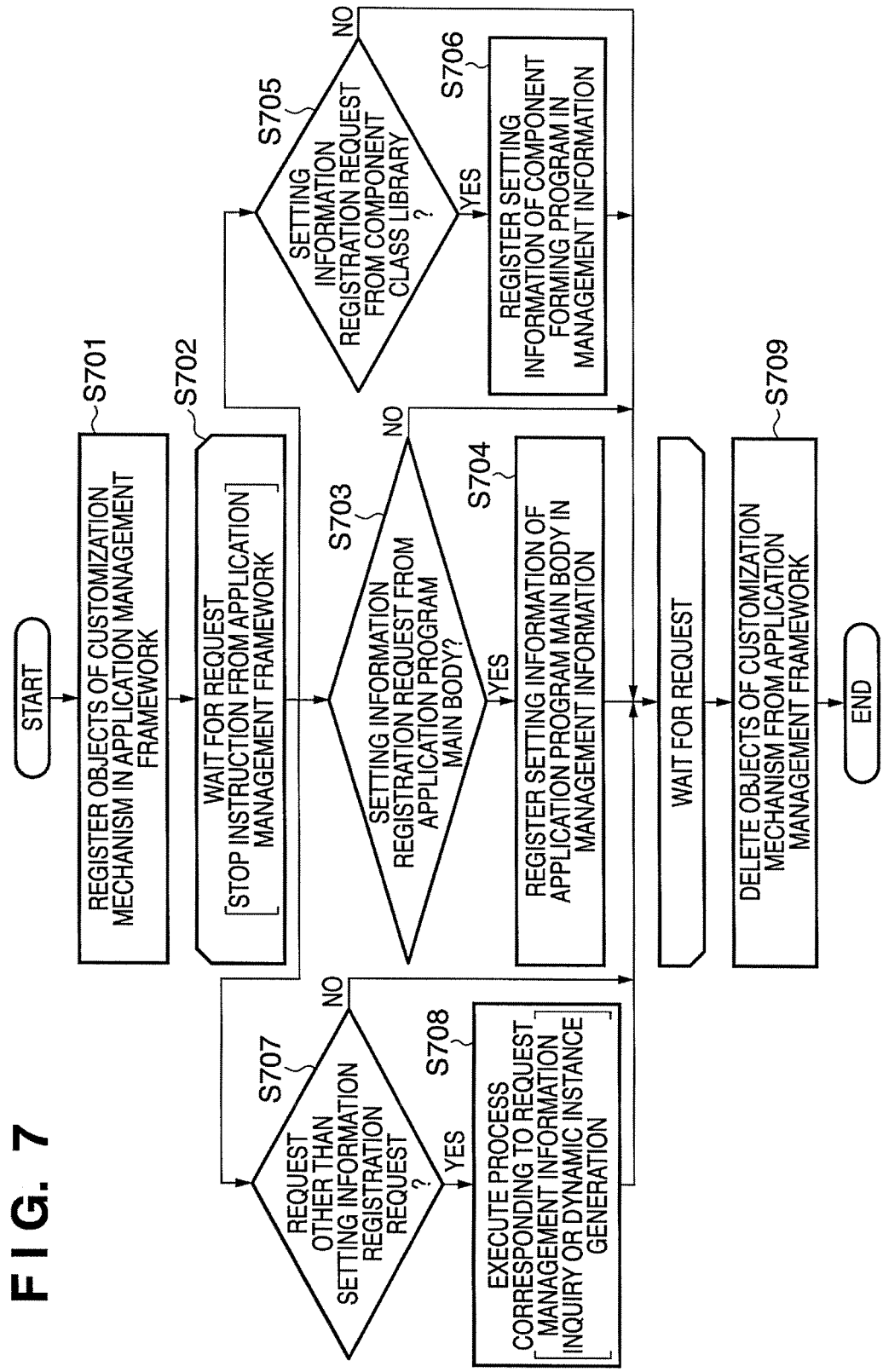
FIG. 7 is a flowchart illustrating the outline of the operation of the customization mechanism 203.

FIG. 7 is a flowchart illustrating the outline of the operation of the customization mechanism 203. In step S701, the customization mechanism 203 registers the objects of its own in the application management framework 201. This makes the functions of the customization mechanism 203 usable from the application program main body 205 on the application management framework 201.

In step S702, the customization mechanism 203 executes a process in accordance with an external request until it receives a stop instruction from the application management framework 201. Upon receiving, as an external request, a request to register the setting information 204 from the application program main body 205, the process advances from step S703 to step S704 to register the setting information 204 of the application program main body 205 as the management information 202.

Upon receiving, as the external request, a request to register the setting information 206 from the component class library 207, the process advances from step S705 to step S706 to register the setting information of the component class library 207 as the management information 202.

Upon receiving, as the external request, a request except the registration requests from the application program main body 205 and component class library 207, the process advances from step S707 to step S708. In step S708, the customization mechanism 203 executes a process according to the request.

More specifically, the customization mechanism 203 executes a component class belonging to each component interface registered in the management information 202 in correspondence with each customization point in accordance with a component instance acquisition request from the application program main body 205, thereby generating a component instance. The generated component instance is transmitted to the application program main body 205.

Upon receiving not the external request but a stop instruction from the application management framework 201, the process advances to step S709 to delete the objects of the customization mechanism 203 from the application management framework 201.

5. Sequence of Process of Application Program Main Body 205

Figure 8:
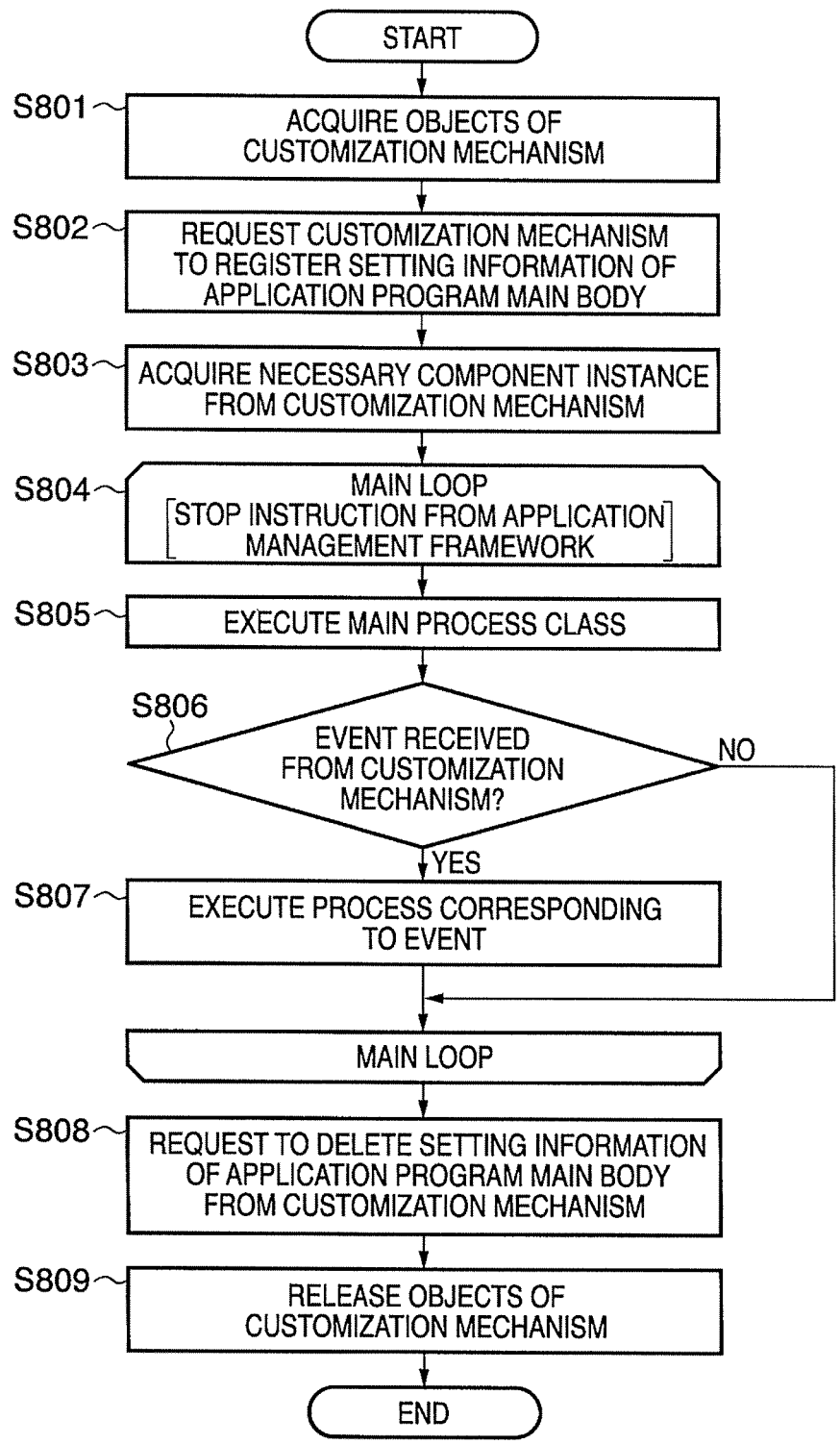
FIG. 8 is a flowchart illustrating the outline of the operation of the application program main body 205.

FIG. 8 is a flowchart illustrating the outline of the operation of the application program main body 205. Upon receiving an execution instruction from the application management framework 201, the application program main body 205 acquires the objects of the customization mechanism 203 from the application management framework 201 in step S801 to use the function of the customization mechanism 203.

In step S802, the setting information 204 of the application program main body 205 is registered in the customization mechanism 203 by using the acquired objects.

In step S803, the application program main body 205 receives a component instance dynamically generated by the customization mechanism 203 on the basis of the management information 202 registered in it. At this time, the application program main body 205 can be constituted dynamically by setting the component instance or embedding the received component instance at a customization point in itself.

In step S805, the application program main body 205 executes the main process class until a stop instruction is received from the application management framework 201 in step S804. In this process loop, upon receiving an event such as uninstallation of the component class library 207 from the customization mechanism 203 (YES in step S806), the application program main body 205 executes a process corresponding to the event in step S807.

If a stop instruction is received from the application management framework 201 in step S804, and the loop is ended, the process advances to step S808. In step S808, a request to delete the setting information 204 of the application program main body 205 from the management information 202 is sent to the customization mechanism 203. Finally in step S809, the objects of the customization mechanism 203 in use are released.

6. Sequence of Process of Component Class Library 207

Figure 9:
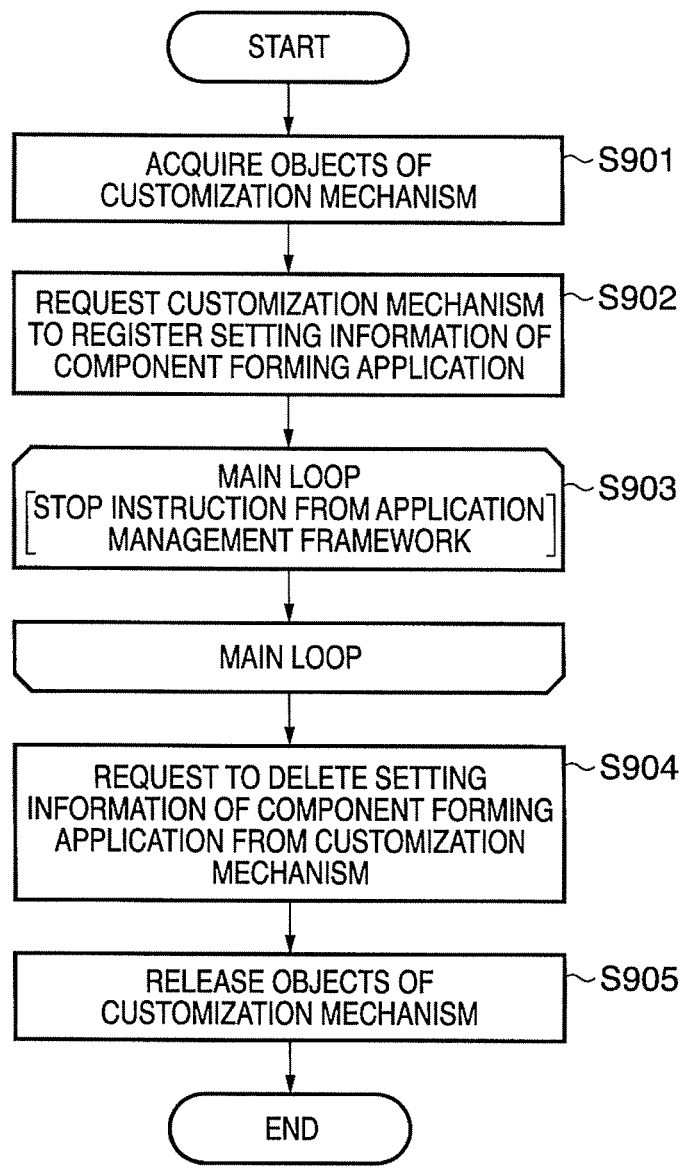
FIG. 9 is a flowchart illustrating the outline of the operation of the component class library 207.

FIG. 9 is a flowchart illustrating the outline of the operation of the component class library 207. Upon receiving an execution instruction from the application management framework 201, the component class library 207 acquires the objects of the customization mechanism 203 from the application management framework 201 in step S901 to use the function of the customization mechanism 203. In step S902, the component class library 207 requests the customization mechanism 203 to register its setting information using the acquired objects.

In step S903, the component class library 207 continues its operation until a stop instruction is received from the application management framework 201. If a stop instruction is received from the application management framework 201 in step S903, a request to delete the setting information 206 of the component class library 207 from the management information 202 is sent to the customization mechanism 203 in step S904. Finally in step S905, the objects of the customization mechanism 203 in use are released.

7. User Interface

A user interface provided by the customization mechanism 203 will be described next. A user interface by a Web browser will be described here. However, the user interface can be implemented by any method.

Figure 10:
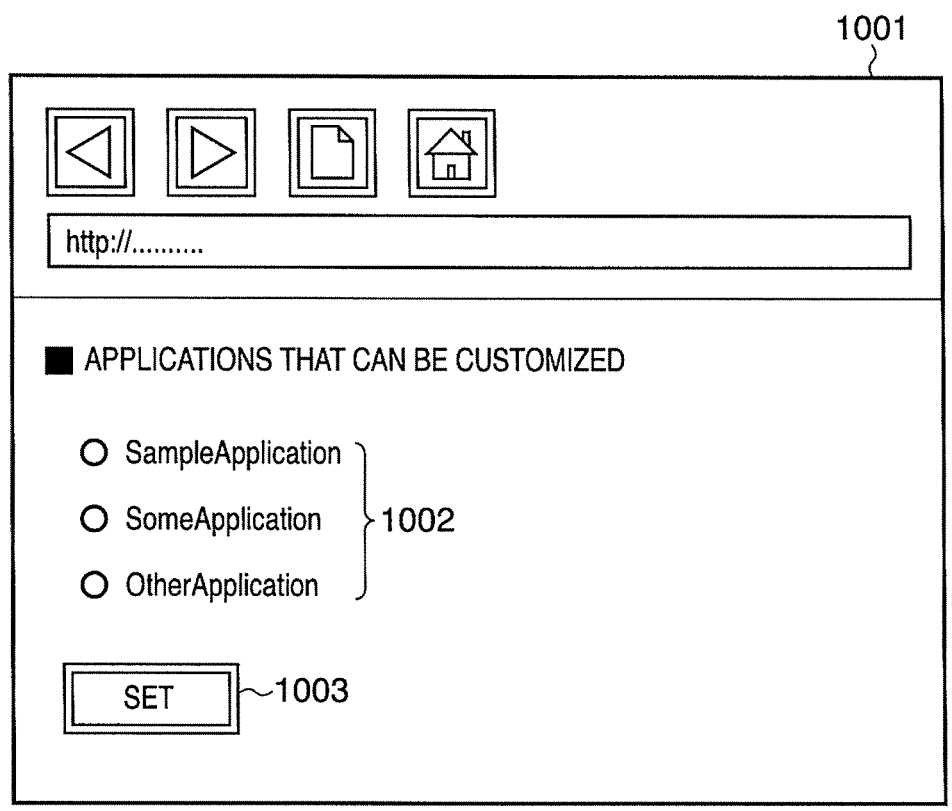
FIG. 10 is a view showing an example of a window which serves as the user interface of the customization mechanism 203 to select the application program main body.

FIG. 10 is a view showing an example of a window which serves as the user interface of the customization mechanism 203 to select a component class. As shown in FIG. 10, a Web browser window 1001 displays a list 1002 of application program main bodies which can be customized by using the customization mechanism 203, and a set button 1003. When the user selects a target application program main body from the list 1002 in the Web browser window 1001 and clicks on the set button 1003, the display changes to the customization window of the application program main body.

Figure 11:
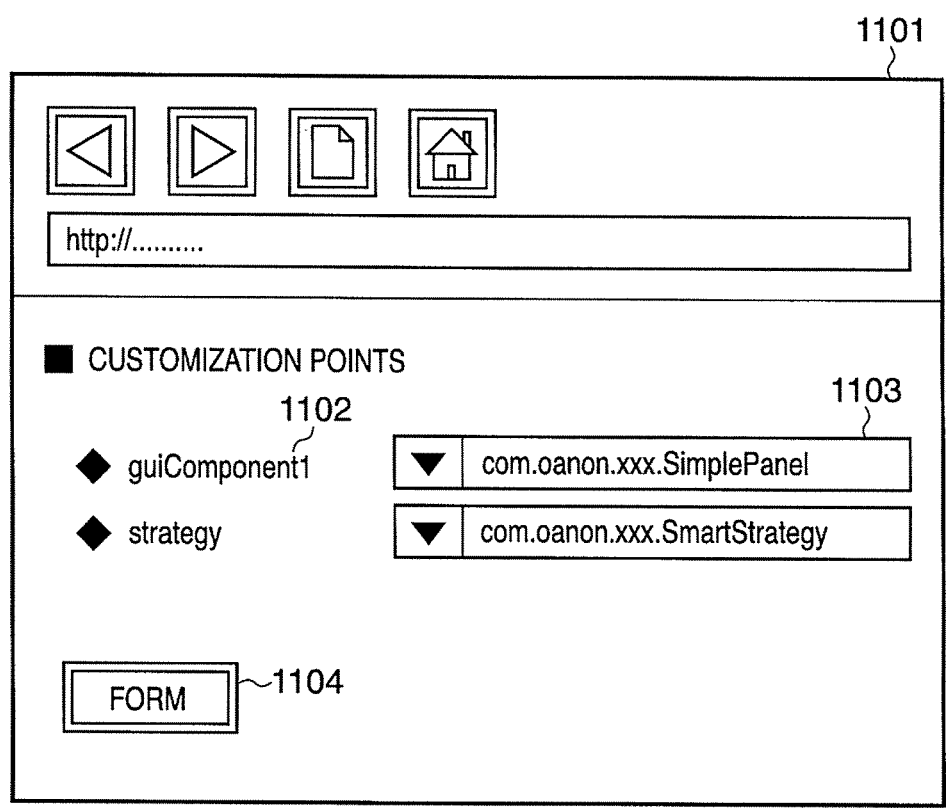
FIG. 11 is a view showing an example of a customization window which serves as the user interface of the customization mechanism 203 for a specific application program main body.

FIG. 11 is a view showing an example of the customization window which serves as the user interface of the customization mechanism 203 for a specific application program main body. A Web browser window 1101 displays a list 1102 of customization points included in the selected application program main body. The Web browser window 1101 also displays a list 1103 of component classes belonging to a component interface corresponding to each customization point, and a form button 1104.

In the Web browser window 1101, the user can select a desired component class from those belonging to a component interface for each customization point and click on the form button 1104. As a result, the application program main body 205 is formed using a component instance generated by executing the selected component class, i.e., customized using the selected component class.

As is apparent from the above description, the application processing system of this embodiment has the customization mechanism, application program main body, and component class library on the application management framework.

When the application program main body includes a component interface, of component classes belonging to the interface, a component class selected by the system user through the customization mechanism is executed.

As a result, in customizing a component class, correction of the application program main body is unnecessary. That is, a component class can be customized by only inputting a selection instruction to the customization mechanism. Hence, even a system user can freely customize a component class.

Other Embodiments

The present invention is also applicable to a system including a plurality of devices (e.g., host computer, interface device, reader, and printer) or an apparatus (e.g., copying machine or facsimile apparatus) including a single device.

The object of the present invention is achieved even by supplying a recording medium which records software program codes for implementing the functions of the above-described embodiment to the system or apparatus and causing the computer (or CPU or MPU) of the system or apparatus to read out and execute the program codes stored in the recording medium.

In this case, the program codes read out from the recording medium implement the functions of the above-described embodiment by themselves, and the recording medium which stores the program codes constitutes the present invention.

Examples of the recording medium usable to supply the program codes are a flexible disk, hard disk, optical disk, magnetooptical disk, CD-ROM, CD-R, magnetic tape, non-volatile memory card, and ROM.

The functions of the above-described embodiment are implemented not only when the computer executes the readout program codes but also when the OS (Operating System) running on the computer partially or wholly executes actual processing on the basis of the instructions of the program codes.

The functions of the above-described embodiment are also implemented when the program codes read out from the recording medium are written in the memory of a function expansion board inserted into the computer or a function expansion unit connected to the computer, and the CPU of the function expansion board or function expansion unit partially or wholly executes actual processing on the basis of the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-337589, filed on Dec. 14, 2006, which is hereby incorporated by reference herein in its entirety.

What is claimed is:

1. An information processing apparatus, comprising:
a storage device that stores: a component class library having a plurality of component classes, an application program main body, and a customization mechanism; and
a processor that executes the application program main body and the customization mechanism, the customization mechanism comprising a set of processor executable instructions for:
registering in a memory, in accordance with a request from the application program main body, first setting information representing a relationship between a first component interface, of a plurality of component interfaces, to initiate a first component class, and a customization point where the first component interface is described in the application program main body;
registering in the memory, in accordance with a request from the component class library, second setting information representing a relationship between each of the plurality of component interfaces stored in the component class library and all component classes belonging to each respective component interface;
generating an instance for a customization point by executing a component class selected by a user, the component class selected from component classes belonging to the plurality of component interfaces that correspond to the first component interface described at the customization point;
embedding the instance generated for the customization point at the customization point in the application program main body; and
executing the application program main body with the instance embedded in the application program main body.

2. The information processing apparatus according to claim 1, wherein the customization mechanism further comprises a set of processor executable instructions for:
displaying, on a user interface, the component classes belonging to the plurality of component interfaces that correspond to the first component interface described at the customization point; and
receiving the component class selected by the user from the displayed component classes.

3. An information processing method of an information processing apparatus that stores an application program main body and a component class library having a plurality of component classes, comprising:
registering in a memory, in accordance with a request from the application program main body, first setting information representing a relationship between a first component interface, of a plurality of component interfaces, to initiate a first component class, and a customization point where the first component interface is described in the application program main body;
registering in the memory, in accordance with a request from the component class library, second setting information representing a relationship between each of the plurality of component interfaces stored in the component class library and all component classes belonging to each respective component interface;
generating an instance for a customization point by executing a component class selected by a user, the component class selected from component classes belonging to the plurality of component interfaces that correspond to the first component interface described at the customization point;
embedding the instance generated for the customization point at the customization point in the application program main body; and
executing the application program main body with the instance embedded in the application program main body.

4. A computer-readable storage medium storing a customization mechanism which causes a computer to execute an information processing method comprising:
registering in a memory, in accordance with a request from the application program main body, first setting information representing a relationship between a first component interface, of a plurality of component interfaces, to initiate a first component class, and a customization point where the first component interface is described in the application program main body;
registering in the memory, in accordance with a request from a component class library, second setting information representing a relationship between each of the plurality of component interfaces stored in the component class library and all component classes belonging to each respective component interface;
generating an instance for a customization point by executing a component class selected by a user, the component class selected from component classes belonging to the plurality of component interfaces that correspond to the first component interface described at the customization point;
embedding the instance generated for the customization point at the customization point in the application program main body; and
executing the application program main body with the instance embedded in the application program main body.

* * * * *